Nov. 25, 1969      J. W. RIDDEL      3,479,875

THERMISTOR LIQUID LEVEL SENSOR AND METHOD FOR MAKING THE SAME

Filed Feb. 20, 1968

INVENTOR.
John W. Riddel
BY
Warren D. Hill
ATTORNEY

United States Patent Office 3,479,875
Patented Nov. 25, 1969

---

3,479,875
THERMISTOR LIQUID LEVEL SENSOR AND METHOD FOR MAKING SAME
John W. Riddel, Fenton, Mich., assignor to General Motors Corporation, Detroit, Mich., a corporation of Delaware
Filed Feb. 20, 1968, Ser. No. 706,865
Int. Cl. G01f 23/00; H05k 3/00
U.S. Cl. 73—295         8 Claims

ABSTRACT OF THE DISCLOSURE

A thermistor formed on one side of an insulated metal strip has formed thereon a pair of spaced parallel printed resistors. A pair of spaced parallel conductors are printed on the resistors. The opposite side of the strip carries a printed heating element and a printed resistor connected in parallel with the thermistor arrangement. The device is formed by coating one side of a nickel strip with thermistor material and oxidizing the nickel to form an insulating coating thereon. The remaining elements are applied by silk-screening.

---

This invention relates to a liquid level sensor of the type which continuously responds to changes in liquid level and to the method of making such a sensor, as well as to an indicating circuit incorporating such a sensor.

It has previously been proposed to determine liquid level by immersing in the liquid heated metallic resistive elements which change in resistance according to temperature. As the liquid level decreases, the average temperature of the element increases because the immersed portion of the element is efficiently cooled by conduction to the liquid while the remainder of the element is not efficiently cooled by the air above the liquid. The total resistance of the element then is a function of the liquid level. Such devices, however, have a very low temperature coefficient of resistance and accordingly exhibit such small changes in resistance that elaborate measuring apparatus is required to effect a visual display of the liquid level information. Such devices are also sensitive to ambient temperature changes in the liquid and the air so that means must be provided to compensate for ambient temperature variations.

Heated thermistors will in a similar manner respond to changes in liquid level.

It has been proposed to utilize thermistors as liquid level sensors by vertically arranging a plurality of thermistors such that each is responsive to the lowering of the liquid past its position. The array of thermistors will produce an output of discrete incremental steps and hence does not continuously monitor changes in the liquid level. Arrangements of that type are also responsive to ambient temperature changes and compensating circuitry or devices must be provided.

It is a general object of this invention to provide a thermistor liquid level sensor which is continuously responsive to changes of liquid level.

It is a further object of this invention to provide a thermistor liquid level sensor which is substantially independent of ambient temperatures.

It is another object of this invention to provide a thermistor liquid level sensor which is adapted to continuously monitor liquid level and which has a structure adapted to large scale manufacture.

It is an additional object of this invention to provide a method of making a thermistor liquid level sensor which is continuously sensitive to level changes.

It is yet another object of the invention to provide a liquid level indicating circuit continuously responsive to changes of liquid level including a thermistor liquid level sensor.

The invention is carried out by providing an elongated element of thermistor material having longitudinally arranged thereon a pair of spaced parallel ribbons of resistive material which in turn have mounted thereon a pair of spaced parallel conductors, also longitudinally disposed along the element. The invention further provides that the element carries a resistor connected in parallel with the thermistor material and additionally carries a heating device.

The invention is further carried out by providing an elongated thermistor element having series connected resistor means formed thereon comprising a resistive pattern having conductors formed therealong so that in use the horizontal spacing of the conductors is uniform along the length of the element and so that the horizontal dimension of the resistive pattern between the conductors is uniform along the length of the element.

The invention is further carried out by providing a circuit including a gage connected to an elongated thermistor sensing element, the impedance of the sensing element being continuously responsive to changes of liquid level and the gage being responsive to changes of the sensor impedance.

The invention is further carried out by providing a thermistor coating on one side of an elongated insulated strip, by printing spaced parallel resistance elements on the thermistor, by printing spaced parallel conductors, one each on the resistance elements, and by printing on the assembly a resistor and a heater.

The above and other advantages will be made more apparent from the following specification taken in conjunction with the accompanying drawings wherein like reference numerals refer to like parts and wherein.

Figure 1:
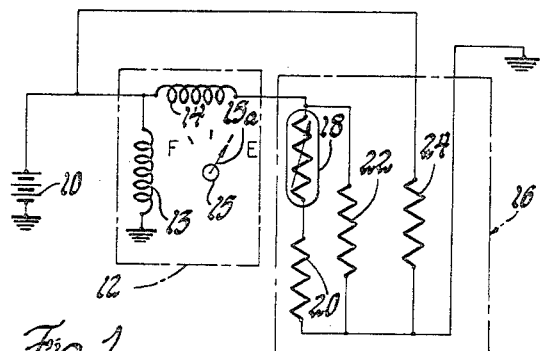
FIGURE 1 is a schematic circuit diagram of a liquid level detecting circuit incorporating the liquid level sensor according to the invention.

FIGURE 1 schematically illustrates a liquid level indicator incorporating a liquid level sensor. This circuit is of the type useful, for example, to indicate the fuel level in motor vehicles. The circuit includes a battery 10 connected to a conventional fuel gage 12 having field coils 13 and 14. A permanent magnet armature 15 is in the magnetic field of the coils 13 and 14 and carries an indicator pointer 15a. The gage in turn is connected to a sensor 16 which would be immersed in a fuel tank.

In operation of the gage, coil 12 provides a reference electromagnetic flux field which tends to align the permanent magnet armature 15 therewith. Coil 14, coupled with current regulating means in the form of sensor 16, provides a variable magnitude flux field which varies in response to the liquid level to be indicated. Superimposing the flux fields, created by coils 13 and 14, produces a resultant flux field which varies in a direction between the axes of the coils 13 and 14. The permanent magnet armature 15 is aligned with the resultant flux field to provide the indication of liquid level. When liquid level is very high, the impedance of sensor 16 is very high so that the current through coil 14 is negligible. Then the flux field of coil 13 positions the armature 15 so that the indicator pointer 15a indicates "full." As liquid level falls the impedance decreases and the current in coil 14 increases so that the indicator pointer 15a moves toward "empty" position.

The sensor 16 includes a thermistor 18 serially connected with resistor 20 which in turn is connected to ground. A parallel resistor 22 is connected as shown with the combination of the thermistor 18 and the resistor 20.

A heating element 24 is connected between the battery 10 and ground.

Figure 2:
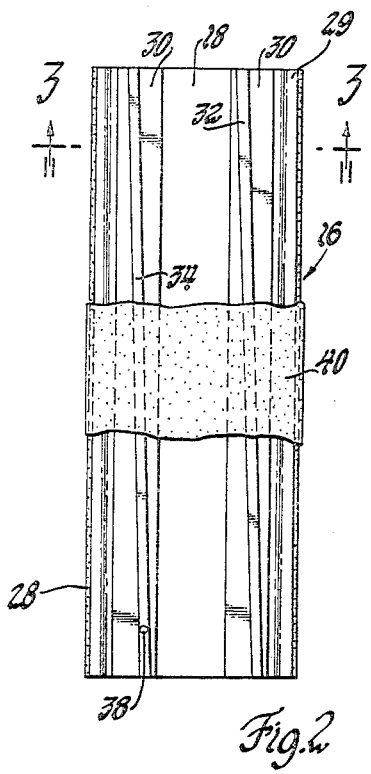
FIGURE 2 is a partly broken away front elevational view of a fuel sensor according to the invention.
Figure 3:
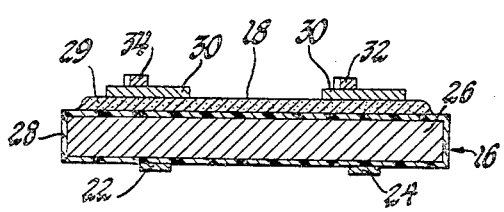
FIGURE 3 is a cross-sectional view taken along line 3—3 of FIGURE 2.
Figure 4:
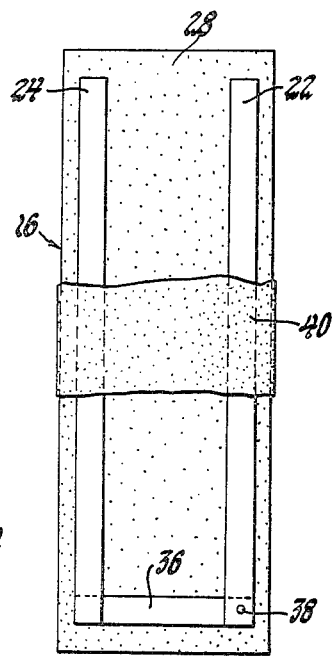
FIGURE 4 is a rear elevational view of the sensor of FIGURE 2.

The sensor as shown in FIGURES 2, 3 and 4 comprise a metal strip 26 having an electrically insulating coating 28. One side of the coated strip 26 is covered with a layer of thermistor material 29. A pair of spaced parallel ribbons 30 of resistance material are formed longitudinally on the surface of the thermistor material 29. A pair of spaced parallel conductors 32 and 34 are formed one on each of the ribbons 30. The other side of the strip 26 has formed thereon a heater 24 and a resistor 22 each in the form of a band of resistive material extending longitudinally along the strip. In the lower end of the unit, the heater 24 and resistor 22 are connected by a conductive link 36 and a rivet 38 passes through the strip 26 to interconnect the heater 24 and the conductor 34. The unit is covered with a layer of insulating material 40.

Figure 5:
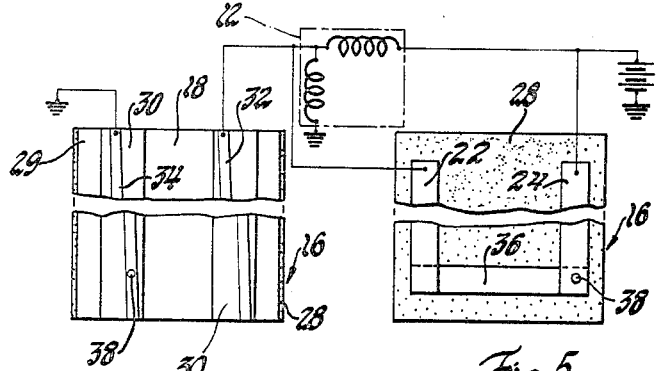
FIGURE 5 is a combined elevational view of opposite sides of a liquid level sensor and interconnecting schematic circuitry.

FIGURE 5 illustrates the circuit interconnection of the various portions of the sensor as dictated by the schematic circuit of FIGURE 1. It will be seen from FIGURE 5 that the rivet 38 in the ground conductor 34 forms a ground connection for the parallel resistor 22 and the heater 24. Those portions of the bands of resistance material 30 which lie between the conductors 32 and 34 in combination comprise the series resistor 20 and further in combination with that portion 18 of the thermistor material 29 which lies between the bands 30 comprises the series combination of the thermistor 18 and resistor 20 whereby the ground conductor 34 serves as the ground connection for the series thermistor-resistor combination while the other conductor 32 is connected to the gage 12.

Figure 6:
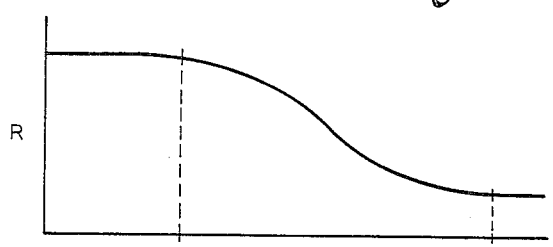
FIGURE 6 is a diagram of the resistance vs. temperature characteristics of the sensor according to the invention.

In operation, when the sensor 16 is disposed within a fuel tank or other liquid reservoir, current flowing through the heater 24 supplies heat to the sensor. Since the heater current does not pass through the gage 12, it does not affect the gage reading. That portion of the sensor which is immersed in liquid is cooled to a relatively low temperature because the liquid efficiently conducts heat from the sensor whereas the portion of the sensor 16 above the liquid level is heated to a high temperature because the surrounding air does not readily conduct heat from the sensor. If the sensor is totally immersed in fuel, the thermistor resistance will be high and if the fuel level decreases, the average resistance decreases, which change of resistance is reflected in the reading of gage 12. The particular series parallel circuit used here provides the well known resistance vs. temperature curve illustrated in FIGURE 6. It will be seen that the extreme portions of the curve below and above the temperatures T–1 and T–2, respectively, are relatively flat. If the temperature of the liquid immersed portion of the sensor 16 lies below T–1 and the temperature of that portion in air is above temperature T–2, then, any portion of the sensor which is exposed to air as a result of decreasing liquid level, acts much as a switch to decrease the resistance of the sensor by an amount which is independent of the ambient temperature. That is, if the highest expected temperature of the immersed portion of the sensor is T–1 and the lowest exposed temperature of the exposed portion is T–2 then ambient temperatures which cause the sensor temperatures to go below T–1 or above T–2 will not effect the resistance of the sensor because of the flatness of the curve in those extreme portions. It obviously is advantageous to limit the separation between T–1 and T–2 so that a relatively small temperature change will effect switching from one flat portion of the curve to the other. This is accomplished by using thermistor material having a high beta.

It will be seen that in order to achieve an accurate linear response from the sensor, the effective horizontal dimensions of the thermistor 18 and the resistance material 30 must be uniform along the length of the sensor 16. Otherwise, fluid level changes at different levels of the sensor would result in different increments of total resistance change for equal increments of fluid level change. If the resistor 20 were formed as a single ribbon of resistance material 30 then the conductors 32 and 34 would have to be aligned precisely parallel with the ribbons 30. Moreover, in order to establish a specific nominal value of the resistor 20 and thermistor 18, the conductors 32 would have to be precisely positioned relative to the inner edge of the single ribbon 30. Such alignment is extremely difficult and as a practical matter, could not be economically accomplished in large scale production. To avoid this difficulty, this invention contemplates that the resistor 20 be separated into two spaced ribbons 30 of resistance material, each being coupled with a conductor 32 or 34. This structure is readily manufactured by conventional printed circuit techniques, such as silk-screening, to provide an accurate and economical sensor. To this end, the two ribbons 30 are simultaneously screen-printed onto the thermistor material 18 so that they are parallel and precisely spaced. It is well known that this geometry is readily accomplished by suitable preparation of the silk-screen master pattern. Then, the conductors 32 and 34 are screen-printed onto the ribbons 30 so as to be parallel and precisely spaced. It will be noted, however, that the conductors 32 and 34 need not be accurately aligned with the ribbons 30 so long as they lie on the ribbons. With this construction the horizontal extent of the thermistor portion 18 is constant throughout the sensor length since it is defined by the inner edges of the parallel ribbons 30. Similarly, the horizontal extent of the resistance material 30 lying between the conductors 32 and 34 and is constant along the sensor length since the combined horizontal resistor dimension is the constant distance between the parallel conductors 32 and 34 minus the constant spacing of the ribbons 30. Therefore, the manufacture of a linear and accurate sensor is accomplished with ease. It is understood, of course, that should a non-linear sensor be desired to compensate for the irregular shape of a liquid reservoir, this can be accomplished by applying the same principles of construction.

A specific example of a method for making a sensor 16 comprises first providing a thin strip of nickel about ¼ inch wide and 5 inches long, coating one side of the strip with thermistor material and then heating the coated nickel substrate up to 18 minutes at a temperature of between 1900° and 2500° F. so that a thin insulating layer of nickel oxide is formed over the entire surface of the nickel strip. The method of forming this coated substrate is more fully set forth in the copending United States Patent application Ser. No. 600,230 filed Dec. 8, 1966, in the names of Riddel and Schwyn. The thermistor material comprises equal molar quantities of manganese oxide, cobalt oxide and zinc oxide. If desired, nickel oxide or copper oxide may be substituted for the zinc oxide. The layer of thermistor material has a thickness in the range of 2–6 mils. Next the resistor ribbons 30 are applied by silk-screening a commercial palladium silver ink onto the thermistor material. These ribbons are one mil thick and have a spacing in the range of .080 to .200 inch. Then the conductors 32 and 34 are screened onto the ribbons 30 in a metallic ink such as platinum gold and having a thickness of 1 mil, spacing of .125 to .250 inch and widths of 10 to 30 mils. The heater 24 and the parallel resistor 22 and the conductive link 36 are applied to the other side of the oxidized nickel strip by silk-screening thereon bands of a resistive ink such as a palladium silver composition, the width of these elements being selected to provide the desired resistance and heating capability. The assembly is then fired to cure the various inks. However, as is well known in the art, additional firings may be required after each printing operation. The heater 24 and the conductor 34 are then connected by rivet 38 and the assembly is covered by an insulating material such as silicone rubber. A sensor so constructed will have a series resistor 20 of about 40 ohms, a parallel resistor 22 of about 100 ohms and a heater resistance of approximately 40 ohms. It follows then that the series parallel combination of resistors 20 and 22 and thermistor 18 will have a maximum resistance of about 100 ohms at temperatures below T–1 and a minimum resistance of about 29 ohms at temperatures above T–2.

It is claimed:

1. A liquid level sensor comprising an elongated strip of insulated metal, a coating of thermistor material on one side of the strip, a pair of spaced parallel ribbons of resistance material on the thermistor material and extending generally in the longitudinal direction of the strip, a pair of spaced parallel elongated conductors each secured to one of said ribbons of resistance material, the other side of the strip bearing a resistance heating element and resistor each generally extending along the strip, and conductive means interconnecting the heating element, the resistor and one of the conductors at one end of the strip.

2. A liquid level sensor continuously responsive to changes of liquid level comprising an elongated element of thermistor material, a pair of spaced parallel ribbons of resistance material on the thermistor material, a pair of spaced parallel elongated conductors each secured to one of said ribbons of resistance material, heating means in thermal engagement with the element, and resistor means connected to the element and arranged electrically in parallel with the thermistor and resistance material.

3. A liquid level sensor continuously responsive to changes of liquid level comprising an elongated element of thermistor material, a pair of spaced parallel conductors secured to the element and extending longitudinally along the element, resistance material covering a portion of the thermistor material between the conductors, the lateral extent of the resistance material being uniform along the element, heating means in thermal engagement with the element, and resistor means connected to the element and arranged electrically in parallel with the thermistor and resistance material.

4. A liquid level indicating circuit comprising a liquid level sensor, a gage connected to the liquid level sensor and responsive to the impedance of the sensor, the sensor including an elongated element of thermistor material, a pair of spaced parallel ribbons of resistance material on the thermistor material, a pair of spaced parallel elongated conductors each secured to one of said ribbons of resistance material, heating means in thermal engagement with the element, and resistor means connected to the element and arranged electrically in parallel with the thermistor and resistance material, one end of the resistor means being connected to the gage.

5. A liquid level indicating circuit comprising a power source, a gage having a field coil connected to the power source and having an armature at least partially controlled by current flow through the field coil, and means for varying the current flow according to liquid level comprising a variable impedance means connected in series with the field coil and the power source, the variable impedance means including an elongated thermistor element serially connected with elongated resistance means, a parallel resistor connected across the thermistor element and resistance means, and a heating element in thermally conductive relation to the thermistor element and connected across the power source.

6. A method of making a liquid level sensor of the type which is continuously responsive to change in liquid level comprising the steps of applying thermistor material to an elongated base element, forming on the thermistor material a pair of spaced parallel ribbons of resistance material by printing resistive ink onto the thermistor material, forming on the ribbons of resistance material a pair of spaced parallel conductors by printing conductive ink onto the resistance material, printing onto the element a heater device and a resistor, and interconnecting the heater device, the resistor and one of the conductors.

7. A method of making a liquid level sensor of the type which is continuously responsive to changes in liquid level comprising the steps of forming an elongated element, applying thermistor material to one surface of the element, printing onto the thermistor material in one step a pair of spaced parallel ribbons of resistance material, printing onto the ribbons of resistance material in one step a pair of spaced parallel conductors, and printing onto another surface of the element a heater device and a resistor, and interconnecting the heater device, the resistor and one of the conductors.

8. A method of making a liquid level sensor of the type which is continuously responsive to changes in liquid level comprising the steps of providing an elongated strip of nickel, coating one side of the strip with thermistor material, forming an insulating oxide layer on the strip by heating, forming on the thermistor material a pair of spaced parallel ribbons of resistance material by silk-screening resistive ink thereon, forming on the ribbons of resistance material a pair of spaced parallel conductors by silk-screening conductive ink thereon, printing onto the other side of the strip a heater device and a resistor, and interconnecting the heater device, the resistor and one of the conductors.

References Cited
UNITED STATES PATENTS 3,360,990    1/1968    Greene et al. _____ 73—295
3,340,606    9/1967    Anderson _____ 29—625

S. CLEMENT SWISHER, Primary Examiner

U.S. Cl. X.R.

29—625